US008190921B1

(12) United States Patent
Harwood et al.

(10) Patent No.: US 8,190,921 B1
(45) Date of Patent: May 29, 2012

(54) METHODOLOGY FOR VAULTING DATA ENCRYPTION KEYS WITH ENCRYPTED STORAGE

(75) Inventors: Jack Harwood, Paxton, MA (US); Thomas E. Linnell, Northborough, MA (US); John T. Fitzgerald, Mansfield, MA (US)

(73) Assignee: EMC Corporation, Hopkinton, MA (US)

( * ) Notice: Subject to any disclaimer, the term of this patent is extended or adjusted under 35 U.S.C. 154(b) by 1184 days.

(21) Appl. No.: 11/965,250

(22) Filed: Dec. 27, 2007

(51) Int. Cl.
*G06F 12/14* (2006.01)
(52) U.S. Cl. ........................ 713/193; 713/189
(58) Field of Classification Search .................. 713/165, 713/189, 193, 194; 709/215, 214
See application file for complete search history.

(56) References Cited

U.S. PATENT DOCUMENTS

| | | | |
|---|---|---|---|
| 5,870,468 A * | 2/1999 | Harrison | 713/165 |
| 6,178,505 B1 | 1/2001 | Schneider et al. | |
| 6,785,728 B1 | 8/2004 | Schneider et al. | |
| 6,842,810 B1 | 1/2005 | Fitzgerald et al. | |
| 6,971,016 B1 | 11/2005 | Barnett | |
| 7,055,027 B1 | 5/2006 | Gunter et al. | |
| 7,110,982 B2 | 9/2006 | Feldman et al. | |
| 7,165,152 B2 | 1/2007 | Blumenau et al. | |
| 7,234,063 B1 | 6/2007 | Baugher et al. | |
| 7,246,233 B2 | 7/2007 | Brabson et al. | |
| 7,260,636 B2 | 8/2007 | Blumenau et al. | |
| 7,272,625 B1 | 9/2007 | Hannel et al. | |
| 7,299,364 B2 * | 11/2007 | Noble et al. | 713/189 |
| 7,310,821 B2 | 12/2007 | Lee et al. | |
| 7,353,388 B1 | 4/2008 | Gilman et al. | |
| 7,752,455 B2 * | 7/2010 | Maheshwari et al. | 713/189 |

OTHER PUBLICATIONS

Maheshwari, U., Vingralek, R., Shapiro, W., "How to build a trusted database system on untrusted storage"; Proceeding OSDI'00 Proceedings of the 4th conference on Symposium on Operating System Design & Implementation—vol. 4, 2000 [retrieved from ACM database on Dec. 15, 2010].*
Dewan, P., Durham, D., Khosravi, H., Long, M., Nagabhushan, G., "A hypervisor-based system for protecting software runtime memory and persistent storage", Proceeding SpringSim '08 Proceedings of the 2008 Spring simulation multiconference © 2008 [retrieved from ACM database on Dec. 15, 2010].*
U.S. Appl. No. 11/965,253, filed Dec. 27, 2007.
U.S. Appl. No. 11/964,789, filed Dec. 27, 2007.
U.S. Appl. No. 11/965,244, filed Dec. 27, 2007.

* cited by examiner

*Primary Examiner* — Saleh Najjar
*Assistant Examiner* — Lashanya Nash
(74) *Attorney, Agent, or Firm* — BainwoodHuang

(57) ABSTRACT

A method is provided to allow for encryption keys to be safely vaulted and for restarts after system failures, even when an external key server is not accessible. In one embodiment, the encryption keys are stored in memory in an encrypted format, the encryption keys being encrypted with a key encryption key (KEK). The data stored in a write cache may be encrypted and written to a vault, protecting it from unauthorized access, but the key table may be written directly to the data vault without need for any further encryption. Because the encryption keys are themselves encrypted, the encryption keys are protected from unauthorized access, ensuring the security of all the encrypted data stored on disk. This embodiment allows the data storage system to be restarted without accessing an external key server. In another embodiment, the KEK is stored in persistent storage within the data storage system, allowing for unattended restart. To enhance security, the KEK may be stored in ROM in a hardened location. Embodiments are also provided for apparatus for practicing the method.

9 Claims, 4 Drawing Sheets

METHODOLOGY FOR VAULTING DATA ENCRYPTION KEYS WITH ENCRYPTED STORAGE

BACKGROUND

In order to protect data from unauthorized access, some data storage systems implement encryption. In these data storage systems, data is encrypted prior to writing it to disk. In one conventional data storage system, encryption is effectuated by storing a set of keys in memory and encrypting data written to disk with one or more of the keys stored in system memory.

Some data storage systems utilize write-back caching in order to gain a performance advantage over write-through caching. In order to avoid a loss of data, a data storage system utilizing write-back caching must take steps to ensure that data stored in the cache but not yet written to disk storage is protected from system failures. Thus, in one conventional data storage system, when a system failure is deemed to be imminent, the entire contents of the system's write cache (stored in volatile memory) is stored (or vaulted) to a vault location of (non-volatile) disk storage. The contents of the write cache include data as well as storage system instructions indicating where the data is to be stored on disk. Since performing all of the storage system instructions stored in the cache can be a time-consuming process (because numerous time-intensive seek operations need be carried out and because the processor overhead may slow the process), writing all of the contents of the write cache to a single contiguous vault location (or a small set of contiguous vault locations) will be much faster (due to fewer seek operations and less processor overhead), allowing more data to be saved before system failure occurs. The vault is also used to store certain system critical parameters that are necessary for a system to initialize and configure itself properly when it is powered on or restarted. If this information is obscured by encryption, then the encryption system must be re-established before the vault can be completely restored and the system can resume normal operation.

SUMMARY

Unfortunately, the above-described conventional data storage systems do not allow encrypted data to be effectively vaulted. If the memory of an encrypted data storage system were to be vaulted, then the encryption keys stored in memory would be stored on disk. Thus, if the vault were not encrypted, then if an unauthorized user were to gain access to the vault disk, that user would be able to decrypt all the data stored on the disks of the data storage system, and in addition, unencrypted cache data would be present on the vault disk. If the vault were encrypted, then the encryption keys would be encrypted as well, rendering them useless without another source of the unencrypted keys.

Even if only the write cache portions of memory were vaulted, but the key table was not vaulted, the encrypted data would not be effectively vaulted. In that case, the keys would be lost after system failure, and the data storage system would not be able to read any of the encrypted data from the disks. In some conventional systems, copies of the keys are also stored on an external key server, so the encrypted data would still be recoverable if access to the key server could be re-established in an attended restart situation. However, if access to the external key server cannot be re-established, the system must remain off-line. Also, this approach requires a restart to be attended by a system administrator.

In contrast, an improved method allows encryption keys to be safely vaulted and for restarts after system failures, even when an external key server is not accessible. In one embodiment, the encryption keys are stored in memory in an encrypted format, the encryption keys being encrypted with a key encryption key. Thus, the data stored in the write cache may be encrypted and written to the vault, protecting it from unauthorized access, but the key table may be written directly to the data vault without need for any further encryption. Because the encryption keys are themselves encrypted, the encryption keys are protected from unauthorized access, thereby ensuring the security of all the encrypted data stored on disk. This embodiment allows the data storage system to be restarted without accessing an external key server, although it may require a system administrator to supply the key encryption key upon restart.

In another embodiment, the key encryption key is stored in persistent storage with the data storage system, allowing for an unattended restart. In order to enhance security, the key encryption key may be stored in ROM in a hardened location. Thus, it is impossible for an unauthorized user to probe the system to read the key encryption key without destroying the ROM.

Embodiments are provided for a method and for apparatus for practicing the method.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
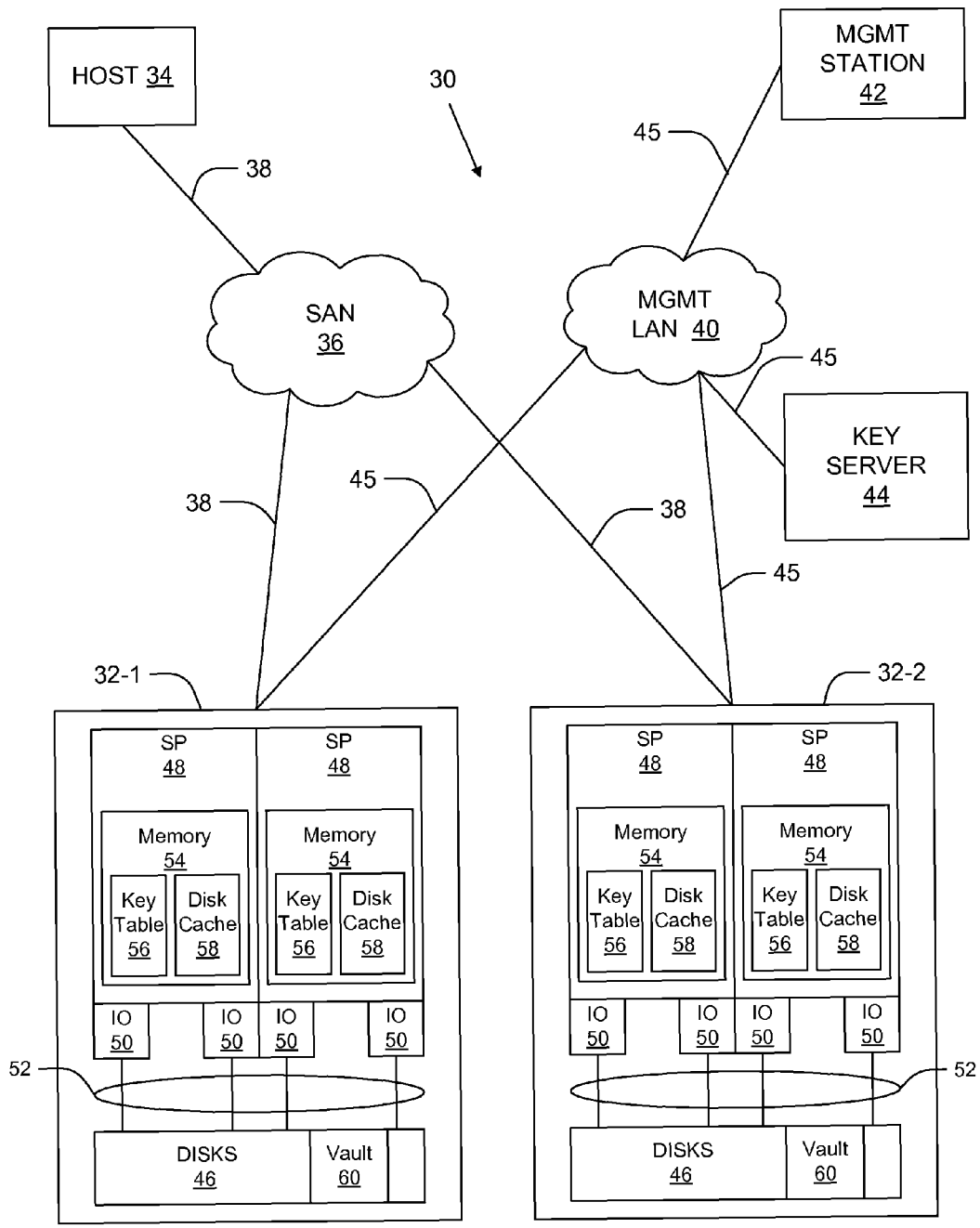
FIG. 1 illustrates an example system for use in practicing one embodiment.

FIG. 1 shows a computer system 30 including data storage systems 32 (shown as 32-1 and 32-2) connected to one or more host computers (HOST) 34 by a storage-area network (SAN) 36. The SAN 36 employs high-bandwidth communications links 38 specifically tailored for data storage communications, such as Fibre Channel. The data storage systems 32 are also connected via a management local-area network (MGMT LAN) 40 to a storage management station (MGMT STATION) 42 and a key server 44. The management LAN 40 generally employs lower-bandwidth links 45 such as 10/100 Mbps Ethernet links, sufficient to carry communications among the management station 42, key server 44, and data storage systems 32 relating to configuration and operational monitoring and control of the data storage systems 32.

As shown, the data storage systems 32 each contain a plurality of data storage devices shown as disks 46, accessed by one or more storage processors (SPs) 48 via respective input/output (I/O) modules 50. The connections 52 between the I/O modules 50 and the disks 46 are also storage-oriented connections, such as Fibre Channel or Small Computer Systems Interconnect (SCSI) links, for example. The connections between the SPs 48 and the I/O modules 50 are typically high-speed circuit board connections, such as low-voltage differential signaling (LVDS). The I/O modules 50 include specialized interface circuitry (not shown) for carrying out high-speed data transfer, and also a processor (also not shown) for performing higher-level functions, such as functions described below. The SPs 48 also perform higher-level storage-related functions, including for example redundant array of inexpensive disks (RAID) functions. Beyond RAID, the data storage systems 32 may implement other forms of redundancy to enhance availability as generally known in the art.

As described in more detail below, the data storage systems 32 implement encrypted data storage for purposes of enhanced data security. The host(s) 34 and SAN 36 operate on so-called "plaintext" or unencrypted data which is directly usable by application programs (such as an operating system) executing on the host(s) 34. However, within the data storage systems 32, data is stored in encrypted form on the disks 46, and thus the storage systems 32 perform data encryption and decryption to translate between the plaintext data of the host(s) 34 and SAN 36 and the encrypted data stored on the disks 46. Any of various encryption/decryption processes may be employed, including the various modes of the Advanced Encryption Standard (AES), and using keys of various sizes. The SPs 48 contain memory 54. The memory 54 contains a key table 56 storing encrypted data encryption keys for encrypting data to be stored on disks 46. The memory 54 also contains a disk cache 58 for caching data to be stored on disks 46 as well as data read from disks 46. The disks 46 also contain a vault portion 60 for vaulting the contents of memory 54 in the event of an imminent failure.

It should be noted that the arrangement of FIG. 1 may represent a physical partitioning into different physical enclosures, but in alternative embodiments some functions may be physically co-located with others. As an example, in one embodiment the SPs 48 and I/O modules 50 may reside in the same physical enclosure. In another embodiment, the SPs 48 and I/O modules 50 may reside in separate enclosures. As a further example, in one embodiment, the I/O modules 50 may be implemented on the same circuit board as an SP 48, while in another embodiment, the I/O modules 50 and the SPs 48 may be implemented on separate circuit boards within the same enclosure. In another embodiment the encryption endpoints are not located within the I/O modules 50 at all, but rather in a separate card or on disk drives or disk drive enclosures.

Figure 2:
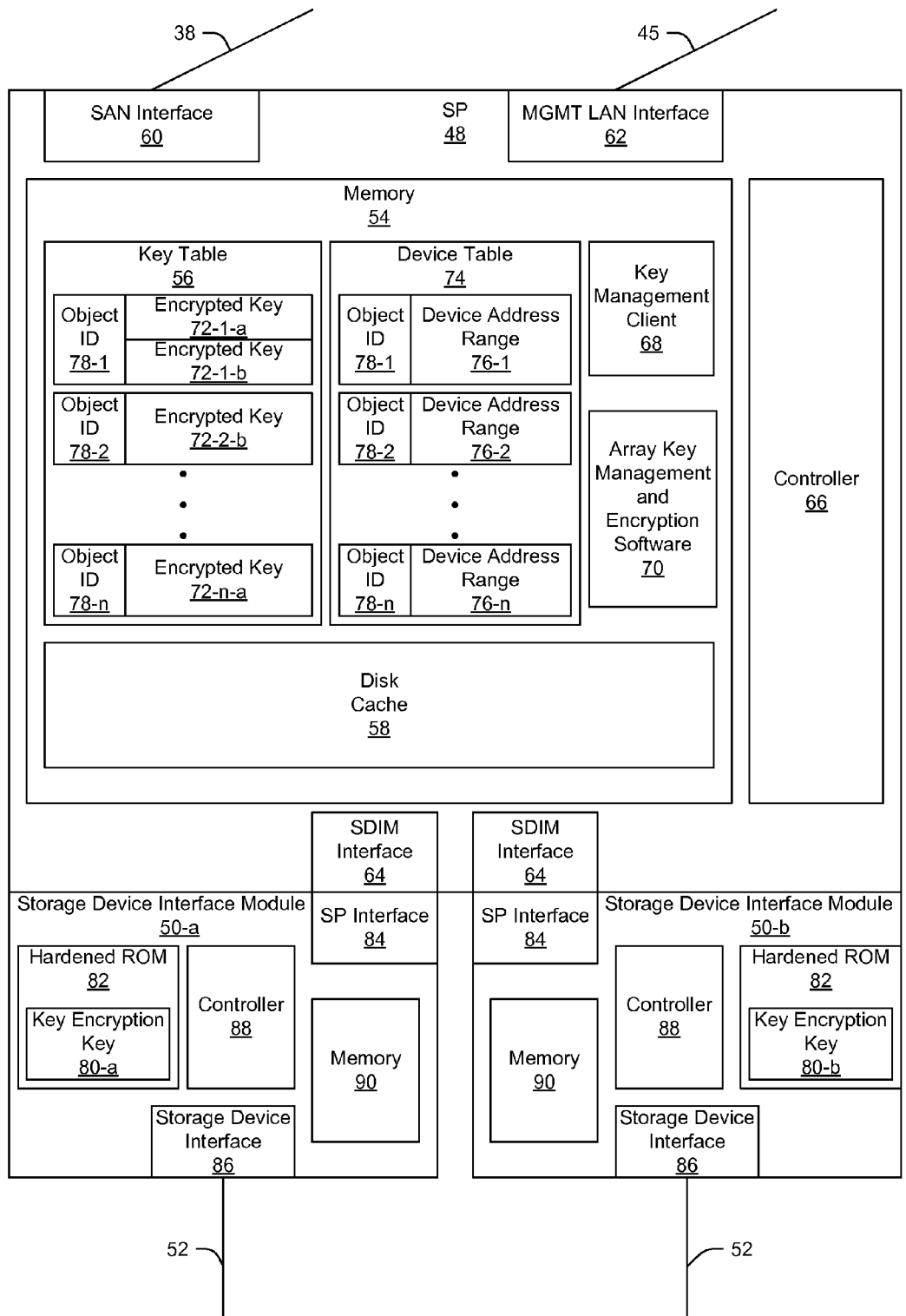
FIG. 2 illustrates an example apparatus of one embodiment.

FIG. 2 depicts an SP 48 and I/O modules 50 of one embodiment in more detail. SP 48 includes a SAN interface 60 for interfacing with SAN 36 and a management LAN interface 62 for interfacing with management LAN 40. In some embodiments, as depicted, SP 48 interfaces with one or more Storage Device Interface Modules (SDIMs) 50 (also known as an I/O module 50) across SDIM interface 64. In another embodiment, not depicted, the SDIM 50 is integrated within the SP 48 itself. SP 48 also includes a controller 66 for executing programs stored in memory 54. One such program is the key management client 68. Another such program is the array key management and encryption software 70. These programs manage the creation, storage, and use of data encryption keys 72 for encrypting data to be stored to disk 46.

As previously mentioned, memory 54 stores a key table 56 and a disk cache 58. Memory 54 also stores device table 74. Data storage area 46 may be broken into several portions, each having a distinct encryption key 72, as described in further detail below. Each portion having a distinct encryption key is defined by a device address range 76, and is associated with a distinct object ID 78. The device table 74 stores a mapping between the device address ranges 76 and the object IDs 78. The key table stores a mapping between the object IDs 78 and the encryption keys 72 used to encrypt data stored within the device address range 76 associated with the object ID 78. However, for additional data security, the encryption keys 72 are stored within the key table 56 in encrypted form. Each entry in the key table 56 may include one or more encrypted encryption keys 72. For example, Object ID 78-1 is associated with encryption key 72-1, but encryption key 72-1 is stored in the entry twice, once each encrypted with a different key encryption key 80. Thus encrypted key 72-1-$a$ is encrypted with key encryption key 80-$a$, and encrypted key 72-1-$b$ is encrypted with key encryption key 80-$b$. Some entries in the key table may only contain a single encrypted version of the encryption key 72. Thus, for example, object ID 78-2 is associated with encryption key 72-2, which is encrypted only with key encryption key 80-$b$, while object ID 78-$n$ is associated with encryption key 72-$n$, which is encrypted only with key encryption key 80-$a$. In some embodiments, not depicted, the key table 56 stores the device address ranges 76, eliminating the need for a separate device table 74. In some embodiments, not depicted, the same object ID 78 may appear several times in the key table, each entry being associated with a different encrypted version of the key 72.

Each SDIM 50 includes a hardened Read-only-memory (ROM) 82 or, in another embodiment (not pictured) a hardened non-volatile flash memory location, to store a key encryption key 80. Thus, SDIM 50-$a$ stores key encryption key 80-$a$ in its hardened ROM 82, while SDIM 50-$b$ stores key encryption key 80-$b$ in its hardened ROM 82. A hardened ROM is a hardware circuit (or set of circuits) capable of storing a piece of data (in this case a key, for example a 512-bit key), such that the circuit is protected from outside probing, such as by being surrounded by a plastic lamination. If an intruder were to gain access to the inside of a SDIM 50 and attempt to electrically probe the hardened ROM 82 in order to discover the value of the key encryption key 80 stored therein, he would not be able to maintain an electrical connection with the hardened ROM 82 to be able to do so. If the intruder were to attempt to pierce the lamination, doing so would likely destroy the hardened ROM 82, thereby rendering the key encryption key 80 stored therein destroyed, and the intruder would not be able to read it. In another embodiment, the hardened memory location may be a register that is not readable external to the encryption endpoint.

Each SDIM 50 also includes an SP interface 84 for interfacing with the SDIM interface 64 of the attached SP 48, a storage device interface 86 for interfacing with the disks 46, a controller 88, and a (volatile) memory 90. In normal operation, the controller 88 is configured to receive data from the SP 48 to be written to disks 46 according to storage instructions. Controller 88 determines exactly where on disk the data is to be written, and with reference to the device table 74 and the key table 56, controller 88 encrypts the data and writes it to the appropriate place on disk. In some embodiments, controller stores key table and device table entries in a cache in memory 90, so that it need not communicate with the SP for every encryption operation that it performs. For additional security, in some arrangements, the encryption keys 72 within the cached entries may be stored in encrypted form, and are only decrypted on the fly as needed to encrypt and decrypt data on the disks 46. However, in other arrangements, encryption keys 72 are stored in plaintext format within memory 90. Controller 88 is only able to decrypt encryption keys 72 which are encrypted with the particular key encryption key 80 that it stores in its hardened ROM 82. Thus, for example, all data stored on disk 46 within device address range 76-2 must be read and written through SDIM 50-b, because encryption key 72-2 is only stored encrypted with key encryption key 80-b, and not with key encryption key 80-a. However, all data stored on disk 46 within device address range 76-1 may be read and written through either SDIM 50-a or SDIM 50-b, because encryption key 72-1 is stored encrypted both with key encryption key 80-a and key encryption key 80-b.

Key management client 68 runs on SP 48. It interfaces with key server 44 to request and receive a key 72 for an object ID 78 that is in need of key 72 (either because the object ID 78 was newly created or because the old key 72 is about to expire). Array key management and encryption software 70 also runs on SP 48. It assigns and manages object IDs 78 to particular device address ranges 76. It also assigns particular SDIMs 50 to be responsible for data associated with particular object IDs 78, allowing the SDIM 50 to request, through the key management client 68, a key 72 for that object ID 78 encrypted with its own key encryption key 80 from key server 44.

Figure 3:
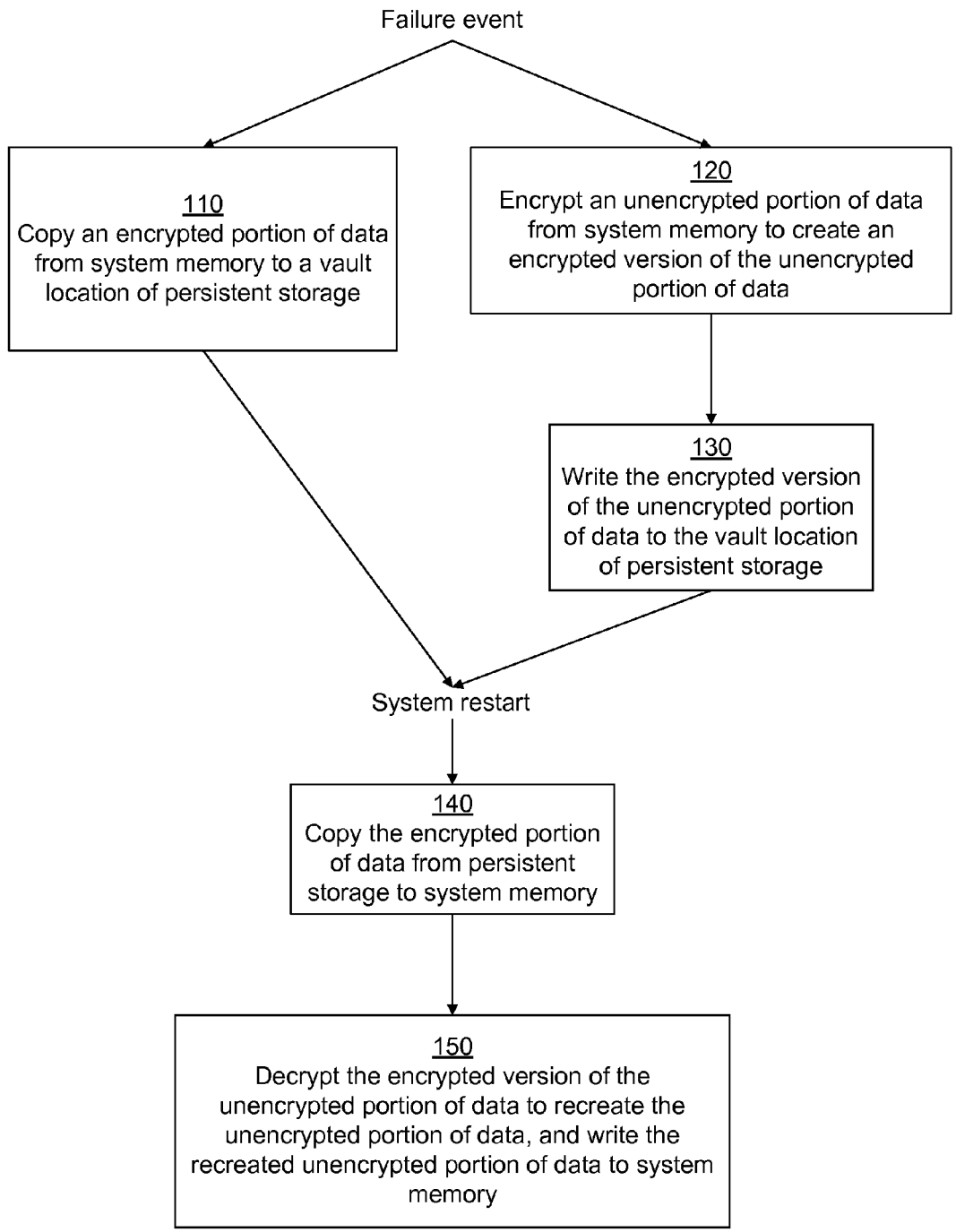
FIG. 3 illustrates an example method of one embodiment.

FIG. 3 depicts method 100 of one embodiment. In response to a failure event, step 110 is performed. In one embodiment, a failure event may be deemed to occur when a system failure is deemed to be imminent. For example, a power failure might occur, leaving the system to operate on backup battery power for only several minutes. As an additional example, a heat sensor may indicate that the system temperature has reached a first threshold (e.g., 120 degrees Fahrenheit), triggering a failure event because the system is programmed to shut down once the temperature climbs above a second threshold (e.g., 130 degrees Fahrenheit), which may occur imminently. In another embodiment, a failure event may be deemed to occur at a first redundant SP 48 when a second redundant SP 48 fails, thereby causing the first SP 48 to no longer be redundant. In that situation, the first SP 48 may vault its write cache and enter a write-through caching mode instead of the faster, but less reliable write-back caching mode.

In step 110, an encrypted portion of data from system memory 54 of an SP 48 is copied to a vault location 60 of persistent storage 46. In some embodiments, this encrypted portion may be entirely encrypted, while in other embodiments, this encrypted portion may be only partially encrypted. Thus, the encrypted portion may include the key table 56/device table 74 combination because the encryption keys 72 stored within the key table 56 and indexed by the device table 74 are encrypted. This encrypted portion is copied to the vault 60 without any further encryption. In some embodiments, this step is performed by the SP 48, while in other embodiments, it is performed by an SDIM 50. In one embodiment, data contained within the key table 56 and device table 74 is transferred via the SDIM interface 64 and the SP interface 84 to the memory 90 of an SDIM 50, where the controller 88 of the SDIM copies the data from memory 90 across the storage device interface 86 to the appropriate portion of disk 46 where the vault 60 is located.

In step 120, which may be performed in parallel with step 110 (or before or after), an unencrypted portion of data from system memory 54 of the SP 48 is encrypted to create an encrypted version of the unencrypted portion of data. In some embodiments, this unencrypted portion of data from system memory 54 includes the disk cache 58, or more particularly, the write-through cache portion of the disk cache 58. Because the disk cache 58 may include sensitive data that would be encrypted once written to disk 46, it must be encrypted before it can be vaulted in order to maintain security in the event that an intruder is able to gain access to the vault 60. In some embodiments, this step is performed by the SP 48, while in other embodiments, it is performed by an SDIM 50. In one embodiment, data contained within the disk cache 58 is transferred via the SDIM interface 64 and the SP interface 84 to the memory 90 of an SDIM 50, where the controller 88 of the SDIM 50 operates on the transferred data by encrypting it with the appropriate encryption key 72 for the vault 60 (which encryption key may be decrypted, in one implementation, on the fly with the key encryption key 80).

Following step 120, step 130 is performed. In step 130, the encrypted version of the unencrypted portion of data is written to the vault location 60 of persistent storage 46. In some embodiments, this step is performed by the SP 48, while in other embodiments, it is performed by an SDIM 50. In one embodiment, controller 88 copies the encrypted data stored in memory 90 across the storage device interface 86 to the appropriate portion of disk 46 where the vault 60 is located.

Following the completion of steps 110 and 130, essential system data (such as the write-through cache and key table 56 and device table 74) are protected against system failure. If system failure actually occurs, then upon system restart, step 140 is performed. In step 140, the portion of data which was originally (at least partially) encrypted in system memory 54 (e.g., the key table and possibly the device tables as well) is copied from the vault portion 60 of persistent storage 46 to system memory 54. No decryption is needed at this point because the data was stored in the vault 60 exactly as it was stored in memory 54. In some embodiments, this step is performed by the SP 48, while in other embodiments, it is performed by an SDIM 50. In one embodiment, controller 88 of an SDIM 50 copies the portion of data which was originally (at least partially) encrypted in system memory 54 across the storage device interface 86 from data storage 46 to the memory 90 of the SDIM 50, where the controller 88 transfers the data from memory 90 via the SDIM interface 64 and the SP interface 84 to the system memory 54, thereby recreating the key table 56 and device table 74 in system memory 54.

After step 140, step 150 is performed. In step 150, the encrypted version of the unencrypted portion of data is read from disk 46 and unencrypted to recreate the unencrypted portion of data, and the recreated unencrypted portion of data is written to system memory 54. In some embodiments, this step is performed by the SP 48, while in other embodiments, it is performed by an SDIM 50. In one embodiment, controller 88 of an SDIM 50 copies the portion of data which was originally unencrypted in system memory 54 across the storage device interface 86 from the vault portion 60 of data storage 46 to the memory 90 of the SDIM 50, where controller 88 operates on the data by decrypting it with the appropriate encryption key 72 for the vault 60 (which encryption key is copied from the key table and decrypted with the key encryption key 80) and transferring the unencrypted data via the SDIM interface 64 and the SP interface 84 to the system memory 54 to recreate the disk cache 58.

At this point, any remaining write cache operations may be carried out from the data in the disk cache 58 using information from the recreated key table 56 and device table 74 to encrypt data written to disk 46. Note that because the key table 56 was vaulted to disk, there was no need to contact the key server 44 to recreate the key table 56.

It should be noted that step 140 may be performed in an unattended restart if the key encryption key 80 is persistently stored on the SDIM 50, as for example in hardened ROM 82. This is because the encrypted keys 72 now (again) stored in memory 54 can be decrypted with the key encryption key 80. This allows the encrypted version of the unencrypted portion of data to be read from disk 46 and unencrypted to recreate the unencrypted portion of data as described above, in connection with step 150. If however, the key encryption key 80 is not persistently stored on the SDIM 50, then an unattended restart is not possible when the key server 44 is not accessible, requiring a system administrator to supply the key encryption key 80 upon restart.

Figure 4:
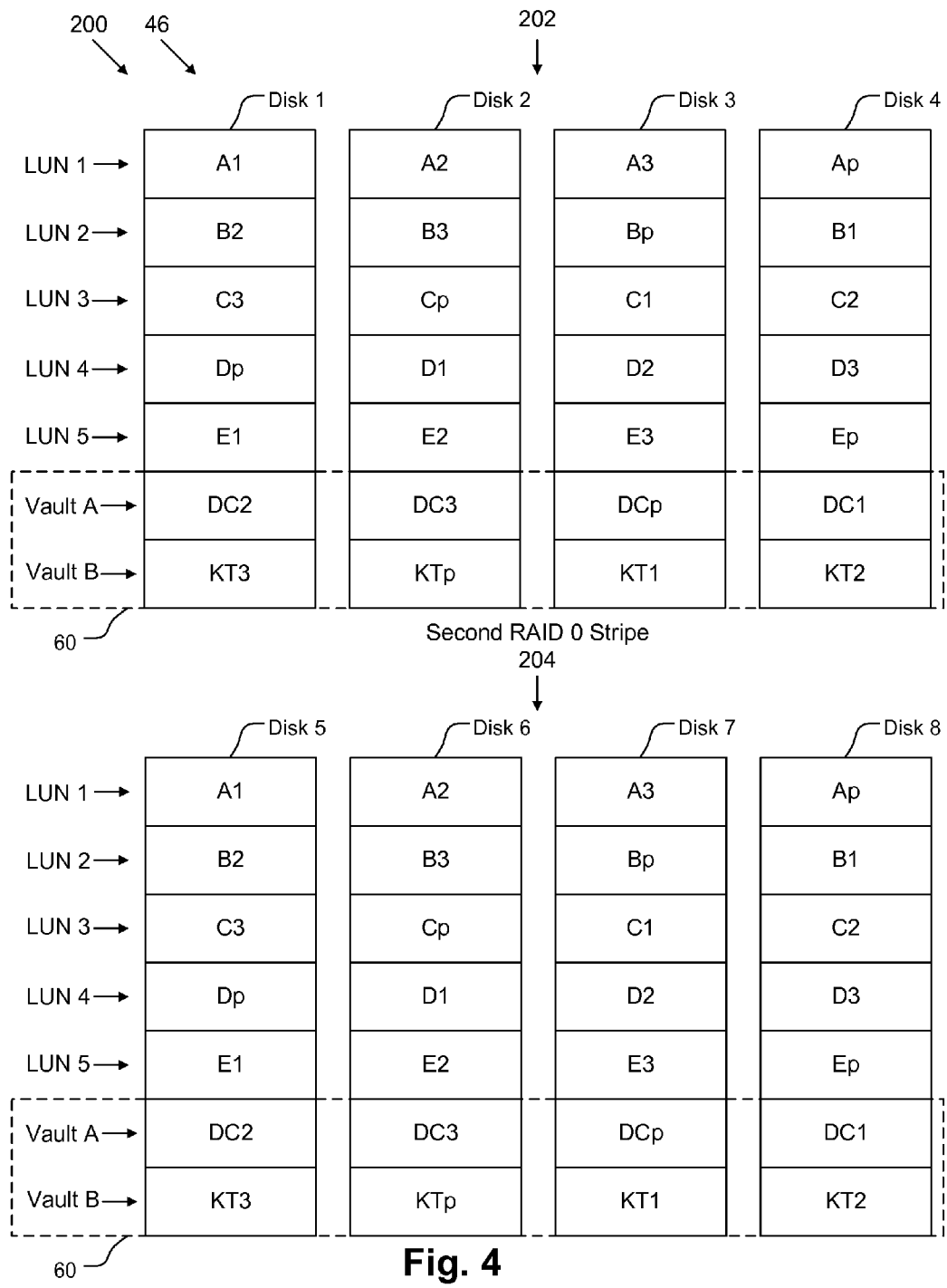
FIG. 4 illustrates an example storage layout for use in practicing one embodiment.

FIG. 4 shows an example configuration of the disks 46 of one embodiment. In this configuration 200, RAID 50 is employed. Thus First RAID 0 Stripe 202 is a RAID 5 group of four disks, Disks 1-4, while Second RAID 0 stripe 204 is a RAID 5 group of four disks, Disks 5-8. Second RAID 0 stripe 204 is a mirrored copy (using RAID 0) of First RAID 0 stripe 202. Each RAID 5 group of disks is split into several logical partitions LUNs 1-5, Vaults A-B. Partitions LUN 1, LUN 2, LUN 3, LUN 4, and LUN 5 are traditional data storage partitions. Each partition is striped across four disks (either disks 1-4 or disks 5-8), using three disks for data, and one disk for parity. Thus, LUN 1 in First RAID 0 stripe 202 has data A1, A2, A3 written to disks 1, 2, and 3, respectively, while parity data Ap is written to disk 4. Similarly, LUN 2 in First RAID 0 stripe 202 has data B1, B2, B3 written to disks 4, 1, and 2, respectively, while parity data Bp is written to disk 3.

Vault 60 is made up of Vault A and Vault B. Vault A is used to store the contents of disk cache 58. It is also striped across four disks as with LUNs 1-5, storing data DC1, DC2, DC3 and parity DCp on disks 4, 1, 2, and 3, respectively. Vault B is used to store the contents of the key table 56, and in some embodiments, also the contents of the device table 74. It is also striped across four disks as with LUNs 1-5, storing data KT1, KT2, KT3 and parity KTp on disks 3, 4, 1, and 2, respectively.

In some embodiments, each disk, Disks 1-8, is an object 78, each disk having a distinct encryption key 72 (i.e., 8 encryption keys are used). In other embodiments, each disk within the First RAID 0 Stripe 202, Disks 1-4, is an object 78, each disk having a distinct encryption key 72, the Second RAID 0 stripe 204 being an exact bit-level copy of First RAID 0 stripe 202 (i.e., 4 encryption keys are used). In some embodiments, each partition, LUNs 1-5, Vault A on each RAID 0 stripe is an object 78, each partition having a distinct encryption key 72 (i.e., 12 encryption keys are used). In other embodiments, each partition, LUNs 1-5, Vault A within the First RAID 0 Stripe 202 is an object 78, each partition having a distinct encryption key 72, the Second RAID 0 stripe 204 being an exact bit-level copy of First RAID 0 stripe 202 (i.e., 6 encryption keys are used). In some embodiments, the portion of each partition, LUNs 1-5, Vaults A, on each disk, Disks 1-8, is an object 78, each partition on each disk having a distinct encryption key 72 (i.e., 48 encryption keys are used). Thus, for example, in such embodiments, data portions A1, A2, and B3 within First RAID 0 stripe 202 and data portions A1, A2, and B3 within Second RAID 0 stripe 204 are all encrypted with six distinct encryption keys 72. In other embodiments, the portion of each partition, LUNs 1-5, Vault A, on each disk within the First RAID 0 Stripe 202, Disks 1-4, is an object 78, each partition on each disk having a distinct encryption key 72, the Second RAID 0 stripe 204 being an exact bit-level copy of First RAID 0 stripe 202 (i.e., 24 encryption keys are used). Thus, for example, in such embodiments, data portions A1, A2, and B3 within each RAID 0 Stripe 202, 204 are all encrypted with three distinct encryption keys 72. In all the above-described embodiments, however, Vault B is not encrypted, although it contains encrypted encryption keys 72 stored within the key table 56.

In some embodiments, the vault 60 is stored on its own separate disk. In other embodiments, Vaults A and B are each stored on their own separate disks. However, these embodiments are less secure, because then all vault data resides on a single disk, being susceptible to theft or data corruption.

Thus, a data storage system 32 is shown for encrypting and storing a disk cache 58 within a vault 60 and storing, without further encryption, a set of encrypted encryption keys 72 (within a key table 56) within the vault 60.

While various embodiments of the invention have been particularly shown and described, it will be understood by those skilled in the art that various changes in form and details may be made therein without departing from the spirit and scope of the invention as defined by the appended claims.

For example, while embodiments have been shown and described as using an 8-disk RAID 50 configuration for disks 46, other configurations may also be used. Thus, for example, RAID 0, 1, 2, 3, 4, or 5 may be used, using any number of disks allowed for such a RAID configuration. Other combined RAID levels, such as, for example, RAID 10, may also be used.

As an additional example, while embodiments have been shown and described as placing the encryption endpoint (i.e., the portion of the system that actually performs the encryption and decryption operations) in the SDIM 50, the encryption endpoint may also be placed elsewhere. Thus, the encryption endpoints could instead be placed within the individual disks 46.

What is claimed is:

1. A method comprising:

in response to a failure event:
copying an encrypted portion of data from system memory to a vault location of persistent storage, the encrypted portion of data including a set of cryptographic keys, each cryptographic key being encrypted with a key encryption key, each cryptographic key for encrypting a specific portion of persistent storage;
encrypting an unencrypted portion of data from system memory to create an encrypted version of the unencrypted portion of data, wherein encrypting the unencrypted portion of data includes encrypting the unencrypted portion of data with a plurality of cryptographic keys of the set of cryptographic keys, each of the plurality of cryptographic keys corresponding to a different portion of the vault location of persistent storage;
writing the encrypted version of the unencrypted portion of data to the vault location of persistent storage; and
performing a system restart;
wherein the unencrypted portion of data includes cached data and instructions for writing the cached data to persistent storage; and in response to the system restart:
copying the encrypted portion of data from persistent storage to system memory; and
in response to copying the encrypted portion of data from persistent storage to system memory, decrypting the encrypted version of the unencrypted portion of data to recreate the unencrypted portion of data, and writing the recreated unencrypted portion of data to system memory, wherein decrypting the encrypted version of the unencrypted portion of data includes:
decrypting the plurality of cryptographic keys with the key encryption key; and
for each portion of the vault location, decrypting the encrypted version of the unencrypted portion of data with the cryptographic key of the plurality of cryptographic keys corresponding to the portion of the vault location.

2. A method as in claim 1 wherein:
the method is performed by a data storage system; and
the failure event is a power failure, the data storage system being configured to temporarily operate on backup battery power after a power failure.

3. A method as in claim 1 wherein:
the method is performed by a data storage system; and
the failure event is an indication from a heat sensor that the data storage system has reached a first threshold temperature, the data storage system being configured to shut down upon reaching a second threshold temperature greater than the first threshold temperature.

4. A method as in claim 1 wherein:
the method is performed by a data storage system having a storage processor;
the data storage system includes a hardened memory location, the hardened memory location including persistent memory for storing the key encryption key, wherein the hardened memory location is protected from external probing, wherein the hardened memory location includes a hardware circuit surrounded by plastic lamination, wherein piercing the plastic lamination would result in destruction of the hardened memory location;
the system restart is an unattended system restart; and
decrypting the encrypted version of the unencrypted portion of data further includes reading the key encryption key from the hardened memory location.

5. A method as in claim 1 wherein:
the method is performed by a data storage system having a storage processor;
the storage processor serves as a write-back caching device; and
system memory stores the cached data and instructions for write-back caching prior to writing the cached data to persistent storage.

6. A storage processor device comprising:
system memory, the system memory storing an unencrypted portion of data and an encrypted portion of data;
a storage device interface arranged to communicate with a set of persistent storage devices; and
a controller coupled to system memory and to the storage device interface, the controller being configured to:
in response to a failure event:
  copy the encrypted portion of data to a vault location of persistent storage, the encrypted portion of data including a set of cryptographic keys, each cryptographic key being encrypted with a key encryption key, each cryptographic key for encrypting a specific portion of persistent storage;
  encrypt the unencrypted portion of data to create an encrypted version of the unencrypted portion of data, wherein encrypting the unencrypted portion of data includes encrypting the unencrypted portion of data with a plurality of cryptographic keys of the set of cryptographic keys, each of the plurality of cryptographic keys corresponding to a different portion of the vault location of persistent storage; and
  write the encrypted version of the unencrypted portion of data to the vault location of persistent storage;
wherein the unencrypted portion of data includes cached data and instructions for writing the cached data to persistent storage; and
in response to a system restart:
  copy the encrypted portion of data from persistent storage to system memory; and
  in response to copying the encrypted portion of data from persistent storage to system memory:
    decrypt the encrypted version of the unencrypted portion of data to recreate the unencrypted portion of data; and
    write the recreated unencrypted portion of data to system memory;
wherein the controller, when decrypting the encrypted version of the unencrypted portion of data, is configured to:
  decrypt the plurality of cryptographic keys with the key encryption key; and
  for each portion of the vault location, decrypt the encrypted version of the unencrypted portion of data with the cryptographic key of the plurality of cryptographic keys corresponding to the portion of the vault location.

7. A storage processor device as in claim 6 wherein:
the storage processor device further comprises a hardened memory location, the hardened memory location including persistent memory for storing the key encryption key, wherein the hardened memory location is protected from external probing;
the hardened memory location includes a hardware circuit surrounded by plastic lamination, wherein piercing the plastic lamination would result in destruction of the hardened memory location; and
the controller, when decrypting the encrypted version of the unencrypted portion of data, is further configured to read the key encryption key from the hardened memory location.

8. A storage processor device comprising:
system memory, the system memory storing an unencrypted portion of data and an encrypted portion of data;
a plurality of storage device interface modules arranged to communicate with a set of persistent storage devices; and
a controller coupled to system memory and to the storage device interface modules, the controller being configured to:
in response to a failure event:
  copy, across one or more of the storage device interface modules, the encrypted portion of data to a vault location of persistent storage, the encrypted portion of data containing a set of cryptographic keys, each cryptographic key being encrypted with one key encryption key of a set of key encryption keys, each cryptographic key for encrypting a specific portion of persistent storage, each key encryption key corresponding to a different storage device interface module;
  direct one or more of the storage device interface modules to encrypt the unencrypted portion of data to create an encrypted version of the unencrypted portion of data, wherein encrypting the unencrypted portion of data includes encrypting the unencrypted portion of data with a plurality of cryptographic keys of the set of cryptographic keys, each of the plurality of cryptographic keys corresponding to a different portion of the vault location of persistent storage; and
  write, across one or more of the storage device interface modules, the encrypted version of the unencrypted portion of data to the vault location of persistent storage;
wherein the unencrypted portion of data includes cached data and instructions for writing the cached data to persistent storage; and in response to a system restart:
  copy, across one or more of the storage device interface modules, the encrypted portion of data from persistent storage to system memory; and in response to copying the encrypted portion of data from persistent storage to system memory:
  direct one or more of the storage device interface modules to decrypt the encrypted version of the unencrypted portion of data to recreate the unencrypted portion of data; and
  write the recreated unencrypted portion of data to system memory;
wherein a storage device interface module of the plurality of storage device interface modules, when decrypting the encrypted version of the unencrypted portion of data, is configured to:
  decrypt the plurality of cryptographic keys with the key encryption key corresponding to that storage device interface module; and
  for each portion of the vault location, decrypt the encrypted version of the unencrypted portion of data with the cryptographic key of the plurality of cryptographic keys corresponding to the portion of the vault location.

9. A storage processor device as in claim 8, wherein:
each storage device interface module includes a hardened memory location, the hardened memory location including persistent memory for storing the key encryption key of that storage device interface module, wherein the hardened memory location is protected from external probing;
the hardened memory location of each storage device interface module includes a hardware circuit surrounded by plastic lamination, wherein piercing the plastic lamination would result in destruction of the hardened memory location; and
each storage device interface module, when decrypting the encrypted version of the unencrypted portion of data, is further configured to read the key encryption key from the hardened memory location.

* * * * *